United States Patent
Kaspa et al.

(10) Patent No.: US 12,248,492 B2
(45) Date of Patent: *Mar. 11, 2025

(54) EXTRACT, TRANSFORM, LOAD MONITORING PLATFORM

(71) Applicant: Capital One Services, LLC, McLean, VA (US)

(72) Inventors: Chanakya Kaspa, Mckinney, TX (US); Divya Mehrotra, Frisco, TX (US); Gregory Muzyn, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,917

(22) Filed: Oct. 26, 2023

(65) Prior Publication Data
US 2024/0054144 A1    Feb. 15, 2024

Related U.S. Application Data

(63) Continuation of application No. 17/303,167, filed on May 21, 2021, now Pat. No. 11,847,130.

(51) Int. Cl.
*G06F 16/25* (2019.01)
*G06F 16/22* (2019.01)
(Continued)

(52) U.S. Cl.
CPC ........ *G06F 16/254* (2019.01); *G06F 16/2282* (2019.01); *G06F 16/26* (2019.01); *G06N 5/04* (2013.01); *G06N 20/00* (2019.01)

(58) Field of Classification Search
CPC .... G06F 16/254; G06F 16/26; G06F 16/2282; G06N 20/00; G06N 5/04
See application file for complete search history.

(56) References Cited

U.S. PATENT DOCUMENTS

| 10,956,790 B1 | 3/2021 | Victoroff et al. |
| 2015/0134589 A1 | 5/2015 | Marrelli et al. |

(Continued)

OTHER PUBLICATIONS

Holtz, "Sankey Diagram," data-to-viz.com, 6 pages, [retrieved from https://www.data-to-viz.com/graph/sankey.html on May 18, 2021].

(Continued)

*Primary Examiner* — Courtney Harmon
(74) *Attorney, Agent, or Firm* — Harrity & Harrity, LLP (57) ABSTRACT

In some implementations, a monitoring device may receive configuration information associated with an extract, transform, load (ETL) pipeline that includes one or more data sources and one or more data sinks. The monitoring device may generate, based on the configuration information, lineage data related to a data flow from the one or more data sources to the one or more data sinks in the ETL pipeline. The monitoring device may generate one or more predicted quality metrics associated with the ETL pipeline using a machine learning model. The monitoring device may generate a visualization in which multiple nodes are arranged to indicate the data flow from the one or more data sources to the one or more data sinks and further in which the one or more predicted quality metrics are encoded within the visualization.

20 Claims, 7 Drawing Sheets

(51) Int. Cl.
  *G06F 16/26*    (2019.01)
  *G06N 5/04*     (2023.01)
  *G06N 20/00*    (2019.01)

(56) References Cited

U.S. PATENT DOCUMENTS

| 2019/0238574 | A1  | 8/2019  | Iliofotou et al. |
| 2020/0159742 | A1* | 5/2020  | McPherson ......... G06F 16/2393 |
| 2021/0019612 | A1* | 1/2021  | Carrasco .................. G06N 5/01 |
| 2021/0157665 | A1  | 5/2021  | Rallapalli et al. |
| 2022/0043826 | A1* | 2/2022  | Zorin ................ G06F 16/24573 |
| 2022/0374442 | A1  | 11/2022 | Kaspa et al. |

OTHER PUBLICATIONS

Tomingas, "Semantic Data Lineage and Impact Analysis of Data Warehouse Workflows," May 2018, pp. 45-58, [retrieved from https://www.researchgate.net/figure/Data-lineage-visualization-example-in-DW-environment-using-Sankey-diagram_fig7_329364764].

Warbington, "Visualizing Paths and Flow with Sankey Diagrams," Qlik Community, Healthcare User Group, Dec. 2017, 10 pages, [retrieved from https://community_qlik.com/t5/Qlik-Healthcare-User-Group/Visualizing-Paths-and-Flow-with-Sankey-Diagrams/td-p/1489571].

* cited by examiner

EXTRACT, TRANSFORM, LOAD MONITORING PLATFORM

RELATED APPLICATION

This application is a continuation of U.S. patent application Ser. No. 17/303,167, filed May 21, 2021, which is incorporated herein by reference in its entirety.

BACKGROUND

In computing, extract, transform, and load (ETL) generally refers to procedures to copy data from one or more source systems into one or more destination (or sink) systems that represent the data in a different manner and/or in a different context than the source system(s). For example, in an ETL system, extraction typically includes importing structured and/or unstructured data from homogeneous or heterogeneous data sources, transformation includes processing and converting the data (e.g., using a data cleansing technique) into a format and/or structure that is suitable for querying and further analysis, and loading includes inserting the transformed data into a final target system, such as an operational data store, a data mart, or a data warehouse. Accordingly, an ETL system may be used to integrate data that may be developed and supported by different vendors or hosted on separate computer hardware, enforce data quality and consistency standards such that data from separate sources can be used together, and/or deliver data in a presentation-ready format to enable developers to build applications around the data and/or enable end users to consume or otherwise utilize the data.

SUMMARY

In some implementations, a system for monitoring an extract, transform, load (ETL) pipeline includes one or more memories and one or more processors, coupled to the one or more memories, configured to: receive configuration information associated with the ETL pipeline that includes one or more data sources and one or more data sinks, wherein the configuration information indicates data records to be extracted from the one or more data sources, transformed from a source format to a target format, and loaded into the one or more data sinks; generate, based on the configuration information, lineage data related to a data flow from the one or more data sources to the one or more data sinks in the ETL pipeline; generate one or more predicted quality metrics associated with the ETL pipeline using a machine learning model, wherein the machine learning model is trained using historical execution data associated with one or more ETL jobs; and generate a visualization in which multiple nodes are arranged to indicate the data flow from the one or more data sources to the one or more data sinks and further in which the one or more predicted quality metrics are encoded within the visualization.

In some implementations, a method for visualizing information related to an ETL pipeline includes receiving, by an ETL monitoring device, configuration information associated with the ETL pipeline that includes one or more data sources and one or more data sinks, wherein the configuration information indicates data records to be extracted from the one or more data sources, transformed from a source format to a target format, and loaded into the one or more data sinks; generating, by the ETL monitoring device, based on the configuration information, lineage data related to a data flow from the one or more data sources to the one or more data sinks in the ETL pipeline; and generating, by the ETL monitoring device, based on the lineage data, a visualization including multiple nodes that are linked by user interface elements to indicate the data flow from the one or more data sources to the one or more data sinks.

In some implementations, a non-transitory computer-readable medium storing a set of instructions includes one or more instructions that, when executed by one or more processors of an ETL monitoring device, cause the ETL monitoring device to: generate lineage data related to a data flow from one or more data sources to one or more data sinks in an ETL pipeline; detect a failure or an anomaly in the ETL pipeline using a machine learning model that is trained using historical execution data associated with one or more ETL jobs; and generate a visualization arranging multiple nodes in multiple columns with user interface elements linking the multiple nodes across the multiple columns to indicate the data flow from the one or more data sources to the one or more data sinks, wherein one or more of the multiple nodes or the user interface elements linking the multiple nodes are depicted using one or more colors to indicate a portion of the data flow affected by the failure or the anomaly.

DETAILED DESCRIPTION

The following detailed description of example implementations refers to the accompanying drawings. The same reference numbers in different drawings may identify the same or similar elements.

Extract, transform, and load (ETL) tools serve an important role in data integration strategies by allowing organizations to gather data from multiple (often heterogeneous) data sources and consolidate the data into a single, centralized location. For example, an ETL tool may be configured to extract raw structured data and/or raw unstructured data from various data sources (e.g., databases, cloud and/or on-premises environments, data warehouses, customer relationship management systems, and/or other sources), transform the raw data into a format compatible with a destination system (e.g., using data cleansing, standardization, deduplication, verification, sorting, and/or other techniques), and then load the transformed data to the destination system for further use. Because an ETL tool is often used to extract, transform, and load large data volumes, the three ETL phases may execute in a pipeline. For example, while one or more processes are extracting raw data from the data sources, one or more transformation processes may execute to transform raw data that has already been extracted and one or more loading processes may execute to load data that has already been transformed into the destination systems without waiting for the extraction and/or transformation process(es) to finish.

Accordingly, because the extraction, transformation, and loading processes represent entry barriers for data coming into the destination system, flaws or breakdowns in and/or between any one or more of the extraction process(es), the transformation process(es), and/or the loading process(es) (and/or sub-processes within any of the ETL phases) are potential points of failure in the ETL pipeline. Furthermore, in some cases, the ETL pipeline might not end when transformed data is loaded to a target data sink or data warehouse, as the loading process(es) may trigger downstream ETL jobs or trigger actions on other systems that the ETL is supporting to enable integration across transactional systems, operational data stores, business intelligence platforms, and/or a cloud infrastructure, among other examples. As a result, in cases where one or more tables storing data to be extracted, transformed, and/or loaded causes a failure in the ETL pipeline and/or the ETL pipeline operates on one or more tables storing inaccurate or incomplete data, problematic data that may be causing issues in the ETL pipeline may be propagated to downstream tables and/or downstream systems consuming the problematic data. Furthermore, because many ETL processes are tasked with handling data with different input formats, different data volumes, and/or other variations, failures in the ETL pipeline can result in scenarios where data is not loaded into the destination system, data is loaded into the destination system incorrectly, and/or other scenarios that may result in incomplete data, inaccurate data, and/or stalls in making data available for further use. Accordingly, providing an ETL system that has a capability to monitor all phases of an ETL job at a granular level would be useful to detect potential problems with past, present, and/or future ETL jobs and/or to identify trends that may eventually lead to breakdowns in the ETL pipeline. However, existing ETL tools lack monitoring capabilities to indicate whether the ETL pipeline is operating on and/or producing accurate data, whether the ETL pipeline is running as expected, different data flows that may be impacted if one or more data stored in one or more tables causes a failure in the ETL pipeline, and/or which ETL jobs are stalled or incomplete due to one or more tables causing a failure.

Some implementations described herein relate to an ETL monitoring platform that can trace a lineage that indicates end-to-end data dependencies within a data flow associated with an ETL pipeline, use machine learning prediction techniques to identify anomalies and/or predict data quality metrics related to timeliness and/or accuracy of the ETL pipeline execution, and generate visualizations that provide detailed information related to the end-to-end data dependencies, anomalies, and/or predicted data quality metrics in the ETL pipeline. For example, as described in further detail herein, an ETL monitoring platform may generate, based on configuration information related to an ETL pipeline, lineage data that represents an end-to-end data flow that includes one or more source tables, one or more destination (or target) tables, and one or more intermediate source tables in a flow from the one or more source tables to the one or more target (or destination) tables. Furthermore, in some implementations, the ETL monitoring platform may execute one or more ETL test cases that are configured to calculate the accuracy and/or completeness associated with one or more ETL jobs that operate at each table level within the ETL pipeline. Accordingly, historical data related to ETL jobs and/or the ETL cases may be used to train one or more machine learning models to predict data quality metrics associated with the ETL pipeline. The ETL monitoring platform may generate a visualization (e.g., a Sankey diagram) that depicts the end-to-end data flow associated with the ETL pipeline, and the visualization may be configured to indicate the predicted data quality metrics and/or real-time information related to the status of the ETL pipeline.

In this way, the ETL monitoring platform may provide granular visibility into the status and data quality within the ETL pipeline, and the visualization that depicts the end-to-end data flow based on the lineage data may be used to identify one or more linked tables that may be affected or impacted by a failure, incomplete status, or inaccuracy at any upstream table. In this way, an ETL job may be terminated or suspended when there is a failure or anomaly in the ETL pipeline or metrics that relate to data quality fail to satisfy a condition (e.g., a service level agreement (SLA) that includes an accuracy or timeliness requirement), which may reduce a need for data cleansing activities by preventing the failure, anomaly, or problematic data from having a ripple effect on downstream tables or ETL jobs. Furthermore, the ETL monitoring platform may provide a capability to send real-time alerts to one or more client devices when there is a failure or anomaly in the ETL pipeline such that the conditions causing the failure or anomaly can be remediated more quickly. In this way, the ETL monitoring platform may provide a capability to monitor all phases of an ETL pipeline, inform users when anomalies or failures are detected in the ETL pipeline such that the users can remediate potential problems in the ETL pipeline, and/or predict data quality metrics associated with the ETL pipeline to identify potentially problematic tables in the ETL pipeline, prevent breakdowns in the ETL pipeline before the breakdowns occur, and/or avoid wasting resources remediating anomalies that may represent false positives, among other examples.

Figure 1A:
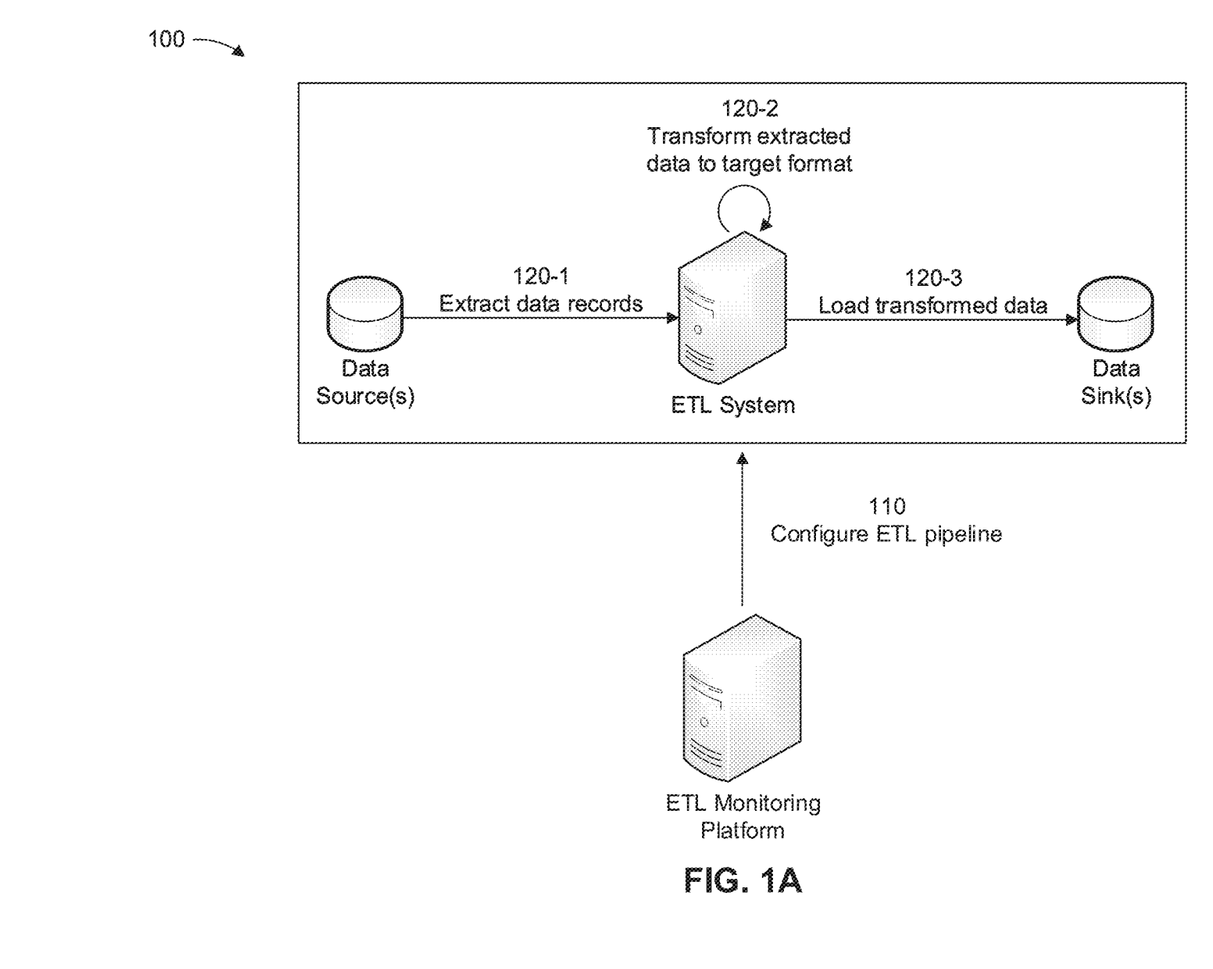
FIGS. 1A-1C are diagrams of an example implementation relating to monitoring, predicting, and/or visualizing information related to an extract, transform, load (ETL) pipeline.
Figure 1B:
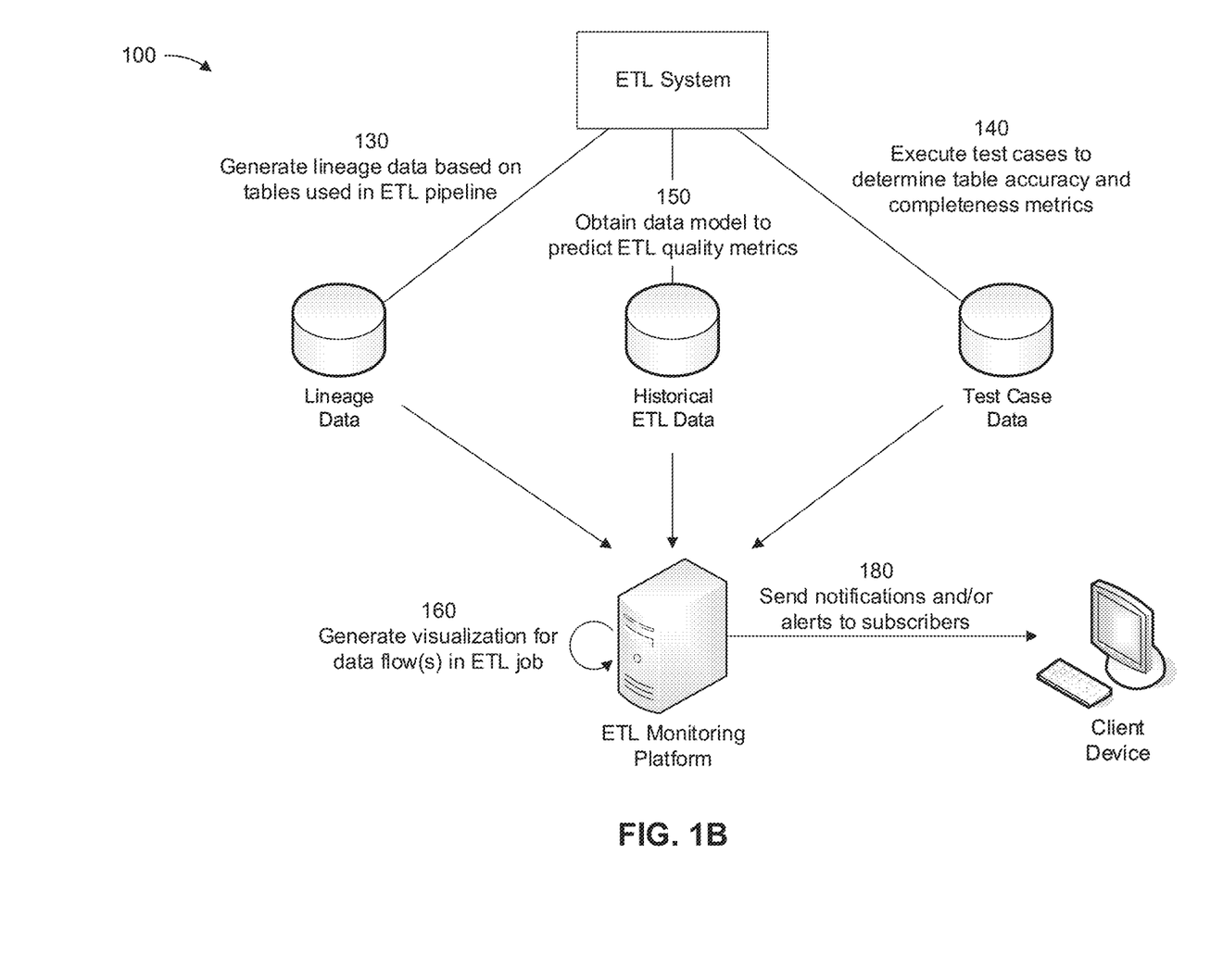
Figure 1C:
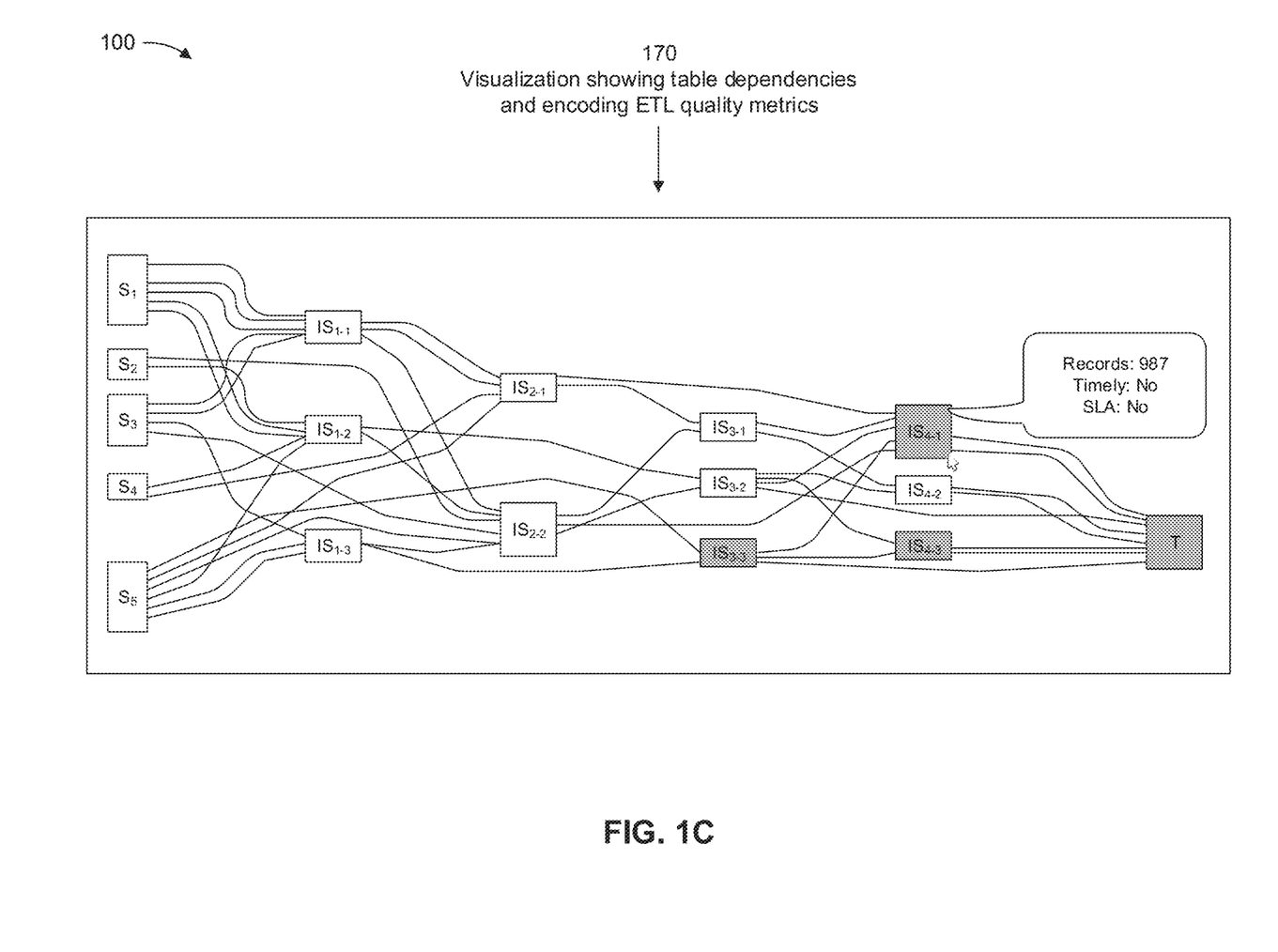

FIGS. 1A-1C are diagrams of an example implementation 100 associated with monitoring, predicting, and/or visualizing information related to an ETL pipeline. As shown in FIGS. 1A-1C, example 100 includes an ETL system, one or more data sources, one or more data sinks, an ETL monitoring platform, one or more data repositories to store lineage data, test case data, and historical ETL data, and a client device. The devices shown in FIGS. 1A-1C are described in more detail in connection with FIG. 3 and FIG. 4.

As shown in FIG. 1A, and by reference number 110, the ETL monitoring platform may configure an ETL pipeline associated with one or more ETL jobs to be executed in the ETL system. For example, in some implementations, each ETL job that the ETL monitoring platform configures in the ETL system may be associated with configuration information that defines one or more data sources from which the ETL system is to extract data records, rules that define how the data records are to be transformed from a source format to a target format, and one or more data sinks into which the data records are to be loaded after the appropriate transformations have been applied. Furthermore, as described in more detail below, the ETL pipeline may include one or more intermediate data sources in a data flow from the one or more data sources to the one or more data sinks. For example, in some implementations, the one or more data sinks may generally store the data records to be extracted in one or more tables, and data records that are extracted may be stored in one or more tables associated with one or more intermediate data sources while transformations are applied to the data records and/or prior to loading the transformed data records into the one or more data sources. Additionally, or alternatively, the ETL pipeline may include various dependencies, nesting relationships, and/or other groupings for various tables that store data records at any stage in the ETL pipeline (e.g., at extract, transform, and/or load stages). Accordingly, as described herein, the ETL monitoring platform may configure a particular ETL pipeline that may be used for one or more ETL jobs by indicating various settings associated with the ETL pipeline.

For example, in some implementations, the settings associated with the ETL pipeline may include one or more connection settings to define parameters that the ETL system uses to connect to the one or more data sources (which may include one or more heterogeneous and/or homogeneous data sources), extraction settings to define queries, commands, and/or other parameters that the ETL system uses to extract the data records from the one or more data sources, transformation settings to define specific transformation settings to be applied to data records extracted from the one or more data sources, lookup settings to define criteria to look up one or more values that correspond to a key in a lookup table that contains one or more key-value pairs, staging settings to prepare (e.g., buffer) transformed data records for loading into the one or more data sinks, destination settings to define parameters that the ETL system uses to connect to the one or more data sinks, and/or loading settings to define parameters to load transformed data into the one or more data sinks.

Furthermore, in some implementations, when configuring a particular ETL pipeline, the client device may indicate scheduling settings for executing an ETL job operating on the ETL pipeline. For example, in some implementations, the scheduling settings may configure the ETL job and/or one or more tasks related to the ETL job to be executed on-demand, at a particular time, at periodic intervals, and/or when certain triggering criteria are satisfied (e.g., when available resources satisfy a threshold, when a data volume of data records to be extracted, transformed, and/or loaded satisfies a threshold, when a new data source or data sink is connected to the ETL system, and/or when anomalies are detected in the extracted, transformed, and/or loaded data, among other examples). Additionally, or alternatively, the scheduling settings may configure the ETL pipeline in which extraction, transformation, and/or loading tasks are executed. For example, in some implementations, the client device may configure scheduling settings that define dependencies associated with different tasks that are performed within the ETL pipeline to extract, transform, and load data records (e.g., nested ETL jobs or tasks that cannot proceed until one or more ETL jobs or tasks that are earlier in the pipeline have completed) and/or tasks that can be executed in parallel once any preconditions are satisfied.

Accordingly, as further shown in FIG. 1A, and by reference numbers 120-1, 120-2, and 120-3, the ETL monitoring platform may configure an ETL pipeline associated with one or more ETL jobs to be executed in the ETL system, and each ETL job may generally include one or more tasks that relate to extracting data records from source tables in the one or more data source, transforming the data records into a target format, and loading the data records the target format into one or more tables in the one or more data sinks. For example, as shown by reference number 120-1, the ETL system may be configured to extract raw data records from the one or more data source(s), which may include structured and/or unstructured data stored in one or more data repositories, cloud environments, on-premises environments, application-specific data repositories, mobile devices, customer relationship management systems, and/or other suitable data sources. In some implementations, the one or more data sources may use heterogeneous and/or homogeneous data organizations and/or data formats to store data records in one or more source tables, and the extraction tasks may be configured to ingest data from the data source(s) and convert the extracted data records to a data stream in which the extracted data records have a common format to enable subsequent transformation processing.

Accordingly, as further shown in FIG. 1A, and by reference number 120-2, the ETL system may be configured to perform one or more transformation tasks to apply rules, policies, and/or other functions to the data records extracted from the data source(s) in order to prepare the data records for loading into the data sink(s). For example, in some implementations, the transformation tasks may include data cleansing to remove inconsistencies, missing values, standardization to apply formatting rules to the extracted data records, deduplication to exclude or discard redundant data records, verification to remove unusable data records and/or flag anomalies in the content of the data records, sorting or ordering to organize the data records according to type or other criteria, joining data from multiple data sources, aggregating data to summarize multiple rows of data, and/or transposing or pivoting to convert multiple columns into multiple rows (or vice versa), among other examples. Furthermore, in some implementations, the transformation tasks may include one or more data validation tasks (e.g., sampling data in real-time to verify that transformed data records match an expected output). In such cases, a failed validation may result in a partial or full rejection of the data (or no rejection, depending on context), whereby all, some, or none of the data records may be handed over to the next stage in the ETL pipeline (e.g., loading tasks) depending on the outcome from the validation. Additionally, or alternatively, in the case of a failed data validation, one or more extraction and/or transformation tasks may be re-executed in an effort to correct issues that may have led to the failed data validation. In some implementations, the one or more data records may be stored in one or more staging tables or one or more intermediate sources while the transformation tasks are executed to transform the data records to the target format.

As further shown in FIG. 1A, and by reference number 120-3, the ETL system may be configured to perform one or more loading tasks to insert, into the data sink(s), transformed data records that have been processed by the tasks in the transformation stage of the ETL pipeline. For example, in some implementations, the loading tasks may be configured to overwrite existing data stored in the data sink(s) with cumulative data and/or to insert new data in a historical form at periodic intervals. Additionally, or alternatively, the loading tasks may be configured to replace, append, and/or supplement data stored in the data sink(s) in a manner that maintains a history and/or audit trail of changes to the data stored in the data sink(s). Furthermore, in some implementations, the loading tasks may be configured to load data records into the data sink(s) all at once based on a full loading configuration and/or at scheduled intervals based on an incremental loading configuration (e.g., depending on available storage and/or processing resources, data volumes to be loaded, and/or other criteria). For example, a full loading configuration may indicate that all data passed from the transformation stage to the loading stage in the ETL pipeline is to be loaded into the data sink(s) as new, unique records, which may be useful for in-depth research purposes. However, a full loading configuration may result in exponential growth in a dataset, which may be difficult to maintain (e.g., potentially causing a failure in the loading stage of the ETL pipeline). Alternatively, an incremental loading configuration may compare incoming data to data already stored in the data sink(s) and produce additional data records to be loaded into the data sink(s) only for new and unique information.

As shown in FIG. 1B, and by reference number 130, the ETL monitoring platform may generate lineage data related to a data flow from one or more tables that store the data records to be extracted from the one or more data sources to one or more tables in the one or more data sinks that are to store the data records after the appropriate transformations have been applied. For example, as described above, an ETL pipeline may generally include one or more data sources that include one or more source tables storing data records to be extracted and one or more data sinks that include one or more target or target tables into which the data records are loaded after the appropriate transformations are applied. Furthermore, in some implementations, the data flow in the ETL pipeline may include one or more intermediate sources (or intermediate source tables) that temporarily store data while transformations are applied, support downstream tables (e.g., storing data ingested by the downstream tables), and/or otherwise store data that moves through various stages of the ETL pipeline. Accordingly, in some implementations, the ETL monitoring platform may generate lineage data related to a data flow from the one or more data sources to the one or more data sinks in the ETL pipeline based on configuration information that indicates data records to be extracted from the one or more data sources, transformed from a source format to a target format, and loaded into the one or more data sinks.

In this way, the lineage data can indicate the source tables where data originates within the ETL pipeline, and can be used to identify where and how the data moves through the ETL pipeline. For example, as described in further detail below, the lineage data can be used to visually represent the end-to-end data flow associated with the ETL pipeline, which may indicate how data originating in one or more source tables flows in one or more hops through one or more intermediate source tables to one or more target tables. In some implementations, the lineage data may be generated using an algorithm that identifies one or more source tables and intermediate data flow hops for a given reference table (e.g., to generate backward lineage data). Additionally, or alternatively, the lineage data may identify, starting from a particular source table, data dependencies that lead to one or more final target tables and intermediate data flow hops between the source table and the final target tables (e.g., to generate forward lineage data). In some implementations, the backward lineage data and the forward lineage data may be combined to form end-to-end lineage data that provides a complete data flow from one or more source tables to one or more target tables, including any intermediate source tables located in one or more hops between the source tables and the target tables. For example, each data dependency may be defined in the lineage data as a key-value object that is converted to a data frame with a source column that identifies a source table and a target column representing a downstream table that depends on or ingests data from the source table.

In some implementations, the ETL monitoring platform may use a scraping technique to track changes to the tables that store data associated with the ETL pipeline over time and ingest lineage data that relates to various data dependencies among the source tables, the intermediate source tables, and the target tables. For example, the ETL monitoring platform may be configured to recursively identify source tables that support a particular target table, where the recursion may continue until no further source tables are returned or all dependencies have been parsed for the particular target table. In this way, the ETL monitoring platform may determine a set of upstream tables that support the target table, and may further determine one or more upstream tables that support each upstream table supporting the target table. In this way, a set of upstream dependencies may be identified for each table that is used in the ETL pipeline, which may be stored as lineage data in one or more data repositories. Accordingly, the ETL monitoring platform may use the scraping technique to record a state of the data sources and/or data sinks storing the tables associated with the ETL pipeline, and may update the lineage data when changes occur in the data sources and/or data sinks. In this way, the ETL monitoring platform may generate detailed information related to the data dependencies among the tables that form the ETL pipeline, which can then be used to generate a visualization that depicts the data dependencies and encodes information related to real-time data quality metrics and/or predicted data quality metrics within the ETL pipeline.

As further shown in FIG. 1B, and by reference number 140, the ETL monitoring platform may execute one or more test cases to determine accuracy and completeness metrics for one or more tables included in the data flow associated with the ETL pipeline. For example, in some implementations, test case data stored in one or more data repositories may be designed or otherwise created to ensure that data that has been extracted from a source table, transformed to a different format, and loaded into a target table is accurate and complete. Furthermore, the test case data may be designed to verify the accuracy and/or completeness of the data at various intermediate stages between the source table and the target table (e.g., based on the lineage data described in further detail above). For example, the test case data may be scheduled for execution in the ETL system to perform production validation testing, sometimes referred to as table balancing or production reconciliation, to verify that data moves through the ETL pipeline in the correct order. In other examples, the test case data may be designed for source to target (validation) testing to verify whether transformed data values corresponds to expected data values, metadata testing to verify that extracted, transformed, and/or loaded data has the correct data length (e.g., ten digits for a phone number) and passes any indexing or constraint checks, data completeness testing to verify that all expected data is loaded in the target tables (e.g., based on a comparison of actual and expected record counts), data quality testing to detect dirty data based on invalid characters and/or character patterns, and/or incremental testing to verify that data insertions and updates are processed as expected in an incremental ETL job. In some implementations, the test case data may be created at a table-level to calculate quality (e.g., reliability) metrics that relate to the accuracy and/or completeness of data stored in each table.

As further shown in FIG. 1B, and by reference number 150, the ETL monitoring platform may obtain a data model (e.g., a machine learning model) that is trained to predict ETL quality metrics based on historical ETL data. For example, in some implementations, the data model may be trained by the ETL monitoring platform, or the data model may be trained using the historical ETL data by a different device that then provides the trained data model to the ETL platform. In either case, as described in further detail below with reference to FIG. 2, historical data related to ETL jobs that are executed in the ETL system may include various metrics that may be used to train the data model, using a machine learning technique, to predict data quality metrics associated with a current or scheduled ETL job, to predict the timeliness of a current or scheduled ETL job (e.g., whether the ETL job will finish executing by an indicated deadline), and/or to detect anomalies in an ETL pipeline (e.g., conditions that may cause an ETL job to fail or stall, such as a broken dependency between a source table and a target table). For example, in some implementations, the historical ETL data that is used to train the data model may be derived from observations of ETL jobs that are executed in the ETL system, which may produce feature sets that include metrics related to data quality (e.g., data accuracy, completeness, freshness, consistency, and/or interpretability), performance (e.g., time efficiency, latency, resource utilization, capacity, quality of service (QoS), service level agreement (SLA), and/or response time), and/or reliability (e.g., availability, fault tolerance, robustness, recoverability), among other examples. Furthermore, in some implementations, the historical ETL data that is used to train the data model may include metrics that are derived from causing the ETL system to execute one or more ETL jobs using the test case data described above.

As further shown in FIG. 1B, and by reference number 160, the ETL monitoring platform may generate a visualization to depict the lineage data, real-time status information, predicted quality metrics, and/or other suitable information related to one or more data flows associated with an ETL job. For example, in some implementations, the ETL monitoring platform may obtain the lineage data associated with the ETL job, which may include dependencies among one or more source tables, one or more intermediate source tables, and one or more target tables that the data associated with the ETL job flows through. Accordingly, each table in the lineage data may be represented in the visualization as a node, and user interface elements linking the various nodes may represent the dependencies among the one or more source tables, the one or more intermediate source tables, and the one or more target tables. Furthermore, data quality metrics that are based on real-time status information and/or predicted quality metrics that are generated using the machine learning data model may be encoded within the visualization. For example, nodes in the visualization may be depicted in a color to represent the status of one or more ETL tasks that are processing data stored in the corresponding table (e.g., in a first color, such as blue, to indicate that the ETL tasks are running normally, are predicted to complete in a timely manner, or are predicted to satisfy an SLA, in a second color, such as red, to indicate that the ETL tasks have stalled, failed, or are otherwise associated with an anomalous, are predicted to not complete in a timely manner, or are predicted to fail satisfy an SLA). Similarly, user interface elements linking the nodes may be color-coded in a color to represent a status of the dependency between an upstream table that corresponds to a first node and a downstream table that corresponds to a second node. In some implementations, the colors in which the nodes and/or user interface elements are depicted may be selected from a color palette that is configured based on a quantity of levels in the lineage data.

For example, as shown in FIG. 1C, and by reference number 170, the ETL monitoring platform may generate a visualization that shows various data dependencies between different tables in the ETL pipeline and encodes information related to quality metrics associated with the ETL pipeline (e.g., real-time quality metrics and/or predicted quality metrics) within the visualization. For example, in FIG. 1C, the visualization is depicted as a Sankey diagram in which various nodes are arranged to indicate the data flow from one or more source tables (labelled $S_1$ through $S_5$) to a target table (labelled T). As further shown, the visualization may indicate various intermediate source tables that are in one or more hops between the source table(s) and the target table(s). For example, in FIG. 1C, the visualization includes the source tables in a left-most column, the target table in a right-most column, and the intermediate source tables in different columns to represent the hops between the source tables and the target table. As further shown, the visualization may encode the data quality metrics, which may be real-time data quality metrics based on current status information obtained from the ETL system or predicted data quality metrics that are generated using the machine learning model. In some implementations, when the visualization is configured as a Sankey diagram (sometimes referred to as an alluvial diagram), each node may have a size that is proportional to an amount of data that flows through the corresponding node, and each user interface element (e.g., curved line) that links a pair of nodes may have a thickness or weight that is proportional to the amount of data that the downstream node ingests from the upstream node. In this way, the Sankey diagram may provide a simple and clear visualization of the various relationships among the source tables, the intermediate tables, and the target tables, and different colors can be used to indicate whether a given node or link is running correctly or failed, expected to complete in a timely or untimely manner, and/or expected to satisfy or fail to satisfy an SLA, among other examples.

For example, in FIG. 1C, an anomaly or failure condition may be detected (e.g., using the machine learning model) in an intermediate source table (labelled $IS_{3-3}$) located in a third hop between the source tables and the target table. Accordingly, the ETL monitoring platform may cause the node corresponding to the intermediate source table associated with the anomaly or failure condition to be depicted in a color that indicates the location of the anomaly or failure (e.g., gray in the illustrated example). Furthermore, the visualization depicts one or more downstream tables that are affected by the anomaly or failure in the upstream intermediate source table (e.g., intermediate source tables corresponding to the nodes labelled $IS_{4-1}$ and $IS_{4-3}$ that ingest data from the intermediate source table corresponding to the node labelled $IS_{3-3}$ and the target table that ingests data from the intermediate source tables corresponding to the nodes labelled $IS_{4-1}$ and $IS_{4-3}$). Furthermore, in some implementations, the visualization may be configured to encode real-time and/or predicted data quality metrics such that the data quality metrics are displayed based on interaction with a node or user interface element in the visualization. For example, in FIG. 1C, data quality metrics associated with one or more ETL tasks that are operating on the intermediate source table corresponding to the node labelled $IS_{4-1}$ may be displayed or otherwise depicted based on a user selecting the node, hovering a mouse pointer over the node, or otherwise interacting with the node.

Referring again to FIG. 1B, as shown by reference number 180, the ETL monitoring platform may send one or more notifications and/or alerts to one or more subscribers associated with one or more client devices based on the real-time quality metrics and/or predicted quality metrics associated with the ETL pipeline. For example, in some implementations, the ETL monitoring platform may send one or more notifications or alerts to indicate when an anomaly or failure is detected in the ETL pipeline such that data engineers or other appropriate personnel can take measures to remediate the problems in the ETL pipeline. In another example, in cases where an anomaly or failure is detected at a particular table in the ETL pipeline, the ETL job may be terminated and/or one or more ETL tasks operating on the data stored in the table associated with the anomaly or failure may be terminated to prevent the problematic data from propagating to one or more downstream tables. In other examples, the notifications or alerts may indicate which tables or data records were affected by an anomaly or failure, provide suggestions or recommendations regarding how to clean the problematic data or otherwise resolve the anomaly or failure, and/or provide suggestions or recommendations to repair or debug code that may be causing the anomaly or failure in the ETL pipeline. Furthermore, in addition to providing real-time alerting when anomalies or failures occur in the ETL pipeline, the ETL monitoring platform may enable the client device to access the visualization of the ETL pipeline, perform queries to search based on real-time and/or predicted data quality metrics, and/or otherwise interact with the visualization to manage the ETL pipeline (e.g., to view a timeliness or SLA compliance prediction for one or more tables in the ETL pipeline, to view real-time metrics or predicted metrics related to accuracy and/or completeness, to view how data flows between various tables and/or how much data flows from one table to another, and/or to identify downstream tables affected by an ETL job failure or table-level failure, among other examples).

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
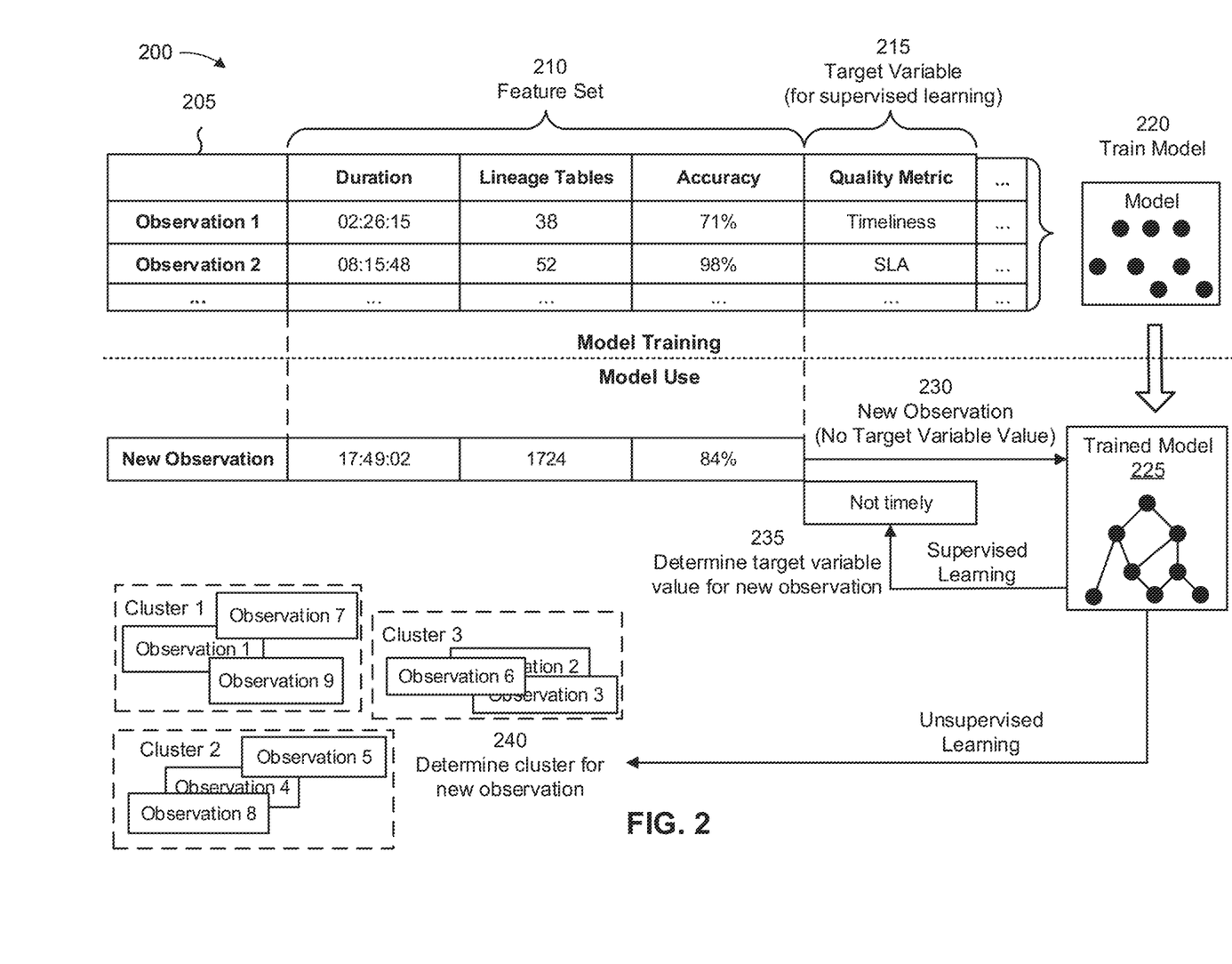
FIG. 2 is a diagram illustrating an example of training and using a machine learning model in connection with monitoring, predicting, and/or visualizing information related to an ETL pipeline.

FIG. 2 is a diagram illustrating an example 200 of training and using a machine learning model in connection with monitoring, predicting, and/or visualizing information related to an ETL pipeline. The machine learning model training and usage described herein may be performed using a machine learning system. The machine learning system may include or may be included in a computing device, a server, a cloud computing environment, or the like, such as the ETL monitoring platform described in more detail elsewhere herein.

As shown by reference number 205, a machine learning model may be trained using a set of observations. The set of observations may be obtained from training data (e.g., historical ETL data), such as data gathered during one or more processes described herein. In some implementations, the machine learning system may receive the set of observations (e.g., as input) from an ETL system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the ETL system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature related to a duration of an ETL job, a second feature related to a number of tables in a lineage associated with the ETL job, a third feature related to an accuracy of the data stored in the tables associated with the ETL job, and so on. As shown, for one or more observations, each feature in the feature set may have a particular value. For example, in a first observation the first feature may indicate that the ETL job had a duration of 2 hours, twenty-six minutes and fifteen seconds, the second feature may indicate that thirty-eight (38) tables were included in the lineage data for the ETL job, the third feature may indicate that the accuracy of the data stored in the tables was 71%, and so on. These features and feature values are provided as examples, and may differ in other examples. For example, the feature set may include one or more of the following features: a status (e.g., completed, failed, and/or stalled), a queue time (e.g., an amount of time that the ETL job was queued prior to execution), a number of data records, and/or a number of hops in the lineage data, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a quality metric, which has a value that indicates a timeliness of the ETL job for the first observation and a value that indicates compliance or non-compliance with a service level agreement (SLA) for a second observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature indicating that an ETL job had a duration of 17 hours, 49 minutes and 2 seconds, the second feature may indicate that 1724 tables were included in the lineage data for the ETL job, the third feature may indicate that the accuracy of the data stored in the tables is 84%, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict that the ETL job will fail or has failed to satisfy a timeliness requirement for the new observation (e.g., based on the length duration of the ETL job and/or the large number of tables in the lineage), as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, partitioning the ETL job into multiple sub-jobs to reduce the number of tables in the lineage and/or the duration of the ETL job. The first automated action may include, for example, transmitting a notification or alert to a client device to indicate that the ETL job is unlikely to complete in a timely manner.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., ETL jobs that fail to satisfy a timeliness requirement), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., ETL jobs that satisfy a timeliness requirement, satisfy an SLA, and/or fail to satisfy an SLA), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to detect anomalies in a data flow associated with an ETL pipeline and/or generate one or more predicted data quality metrics associated with the ETL pipeline. The machine learning system enables recognition and/or identification of tens, hundreds, thousands, or millions of features and/or feature values for tens, hundreds, thousands, or millions of observations, thereby increasing accuracy and consistency and reducing delay associated with detecting anomalies and/or generating predicted data quality metrics relative to requiring computing resources to be allocated for tens, hundreds, or thousands of operators to manually detect anomalies and/or perform data analytics to derive data quality metrics using the features or feature values.

As indicated above, FIG. 2 is provided as an example. Other examples may differ from what is described in connection with FIG. 2.

Figure 3:
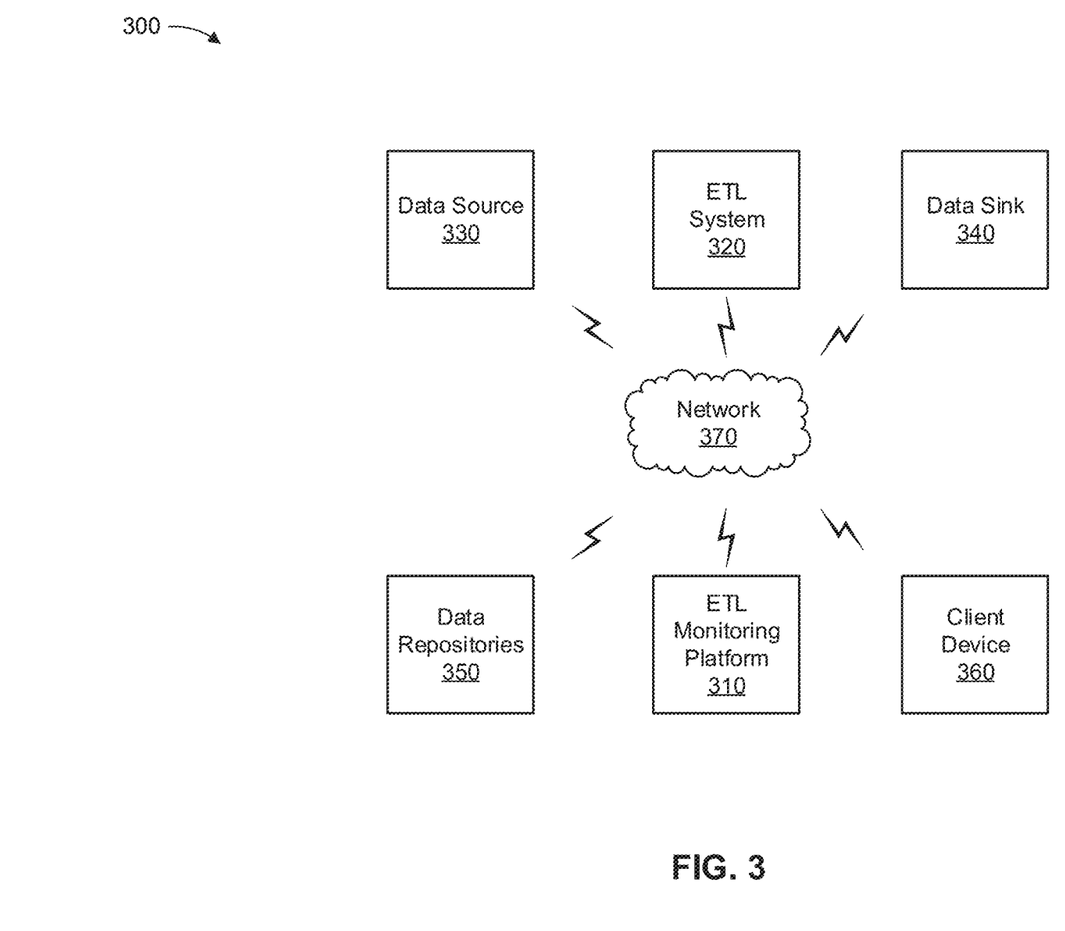
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an ETL monitoring platform 310, an ETL system 320, a data source 330, a data sink 340, one or more data repositories 350, a client device 360, and/or a network 370. Devices of environment 300 may interconnect via wired connections and/or wireless connections.

The ETL monitoring platform 310 includes one or more devices capable of receiving, generating, storing, processing, providing, and/or routing information associated with an ETL pipeline and/or one or more ETL jobs that are running and/or scheduled in the ETL system 320, as described in more detail elsewhere herein. The ETL monitoring platform 310 may include a communication device and/or a computing device. For example, the ETL monitoring platform 310 may include a server, such as an application server, a client server, a web server, a database server, a host server, a proxy server, a virtual server (e.g., executing on computing hardware), or a server in a cloud computing system. In some implementations, the ETL monitoring platform 310 includes computing hardware used in a cloud computing environment.

The ETL system 320 includes one or more devices capable of receiving, generating, storing, processing, providing, and/or routing information associated with one or more ETL jobs that are scheduled in the ETL system 320, as described elsewhere herein. The ETL system 320 may include a communication device and/or a computing device. For example, the ETL system 320 may include a server, such as an application server, a client server, a web server, a database server, a host server, a proxy server, a virtual server (e.g., executing on computing hardware), or a server in a cloud computing system. In some implementations, the ETL system 320 includes computing hardware used in a cloud computing environment.

The data source 330 includes one or more devices capable of receiving, generating, storing, processing, and/or providing information associated with one or more ETL jobs (e.g., data records extracted by the ETL system 320), as described elsewhere herein. The data source 330 may include a communication device and/or a computing device. For example, the data source 330 may include a database, a cloud and/or on-premises environment, a data warehouse, a customer relationship management system, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 330 may communicate with one or more other devices of environment 300, as described elsewhere herein.

The data sink 340 includes one or more devices capable of receiving, generating, storing, processing, and/or providing information associated with one or more ETL jobs (e.g., data records that have been extracted from the data source 330 and transformed by the ETL system 320), as described in more detail elsewhere herein. The data sink 340 may include a communication device and/or a computing device. For example, the data sink 340 may include a database, a data warehouse, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data sink 340 may communicate with one or more other devices of environment 300, as described elsewhere herein.

The data repositories 350 include one or more storage devices capable of receiving, generating, storing, processing, and/or providing information associated with an ETL pipeline, such as lineage data representing an end-to-end data flow in the ETL pipeline, data that relates to one or more test cases that are executed in the ETL system 320 to determine data quality metrics associated with one or more tables in the ETL pipeline, historical data related to ETL jobs that are executed in the ETL system 320, and/or data quality metrics associated with one or more ETL jobs that are scheduled or executed in the ETL system 320, as described elsewhere herein. For example, the data repositories 350 may include a data warehouse, a database engine, a database, a data center, a cloud computing resource, a table, a list, and/or a data structure. In some implementations, the data repositories 350 may receive information from and/or transmit information to the ETL monitoring platform, the ETL system 320, and/or the client device 360.

The client device 360 includes one or more devices capable of receiving, generating, storing, processing, and/or providing information associated with an ETL pipeline, one or more ETL jobs executed in the ETL system 320, real-time and/or predicted data quality metrics associated with the ETL pipeline and/or the ETL job(s) executed in the ETL system 320, a visualization that indicates an end-to-end data flow in the ETL pipeline and/or encodes the data quality metrics associated with the ETL pipeline, among other examples, as described in more detail elsewhere herein. The client device 360 may include a communication device and/or a computing device. For example, the client device 360 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 370 includes one or more wired and/or wireless networks. For example, the network 370 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 370 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
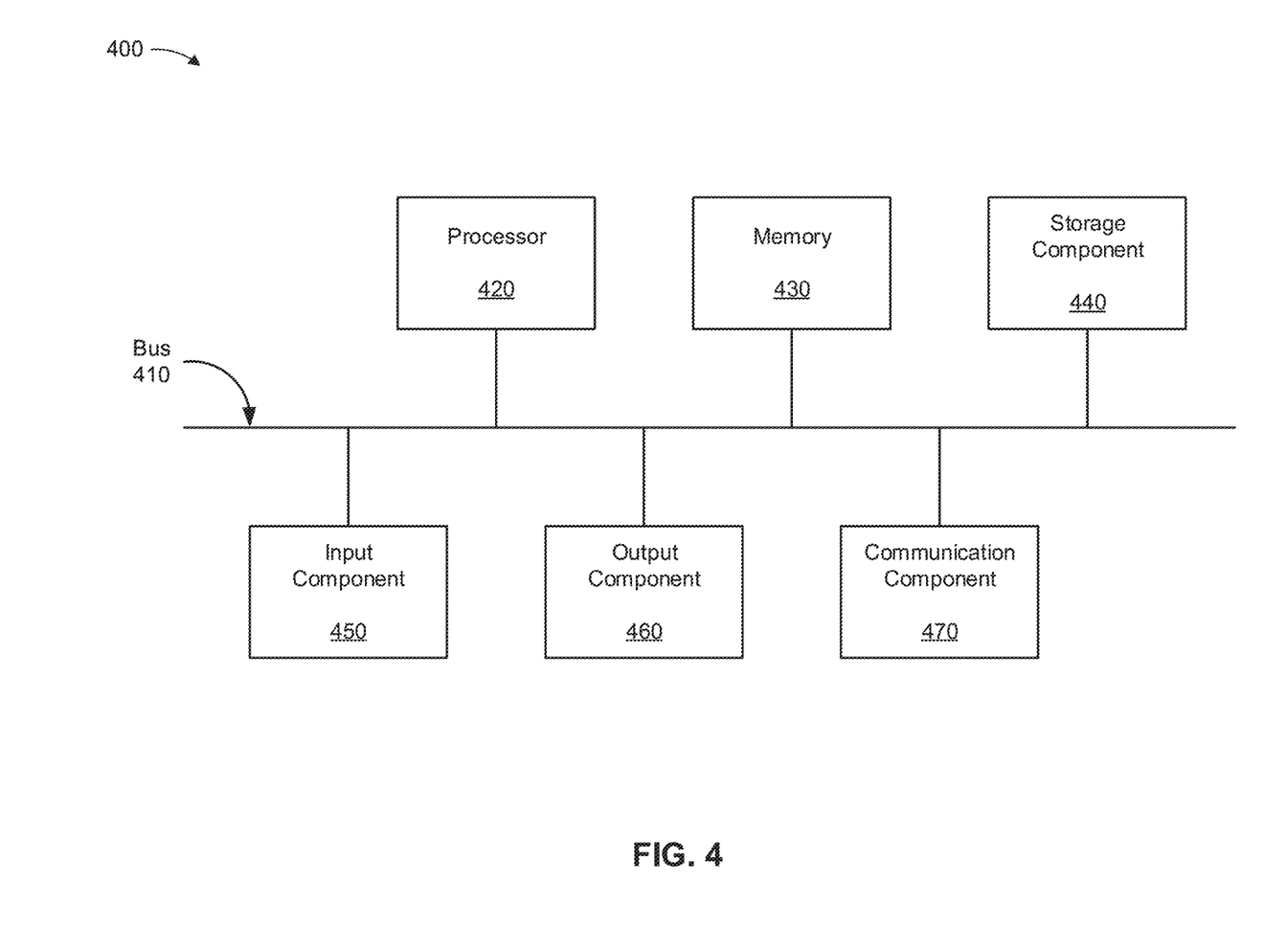
FIG. 4 is a diagram of example components of one or more devices of FIG. 3.

FIG. 4 is a diagram of example components of a device 400, which may correspond to ETL monitoring platform 310, ETL system 320, data source 330, data sink 340, data repositories 350, and/or client device 360. In some implementations, ETL monitoring platform 310, ETL system 320, data source 330, data sink 340, data repositories 350, and/or client device 360 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
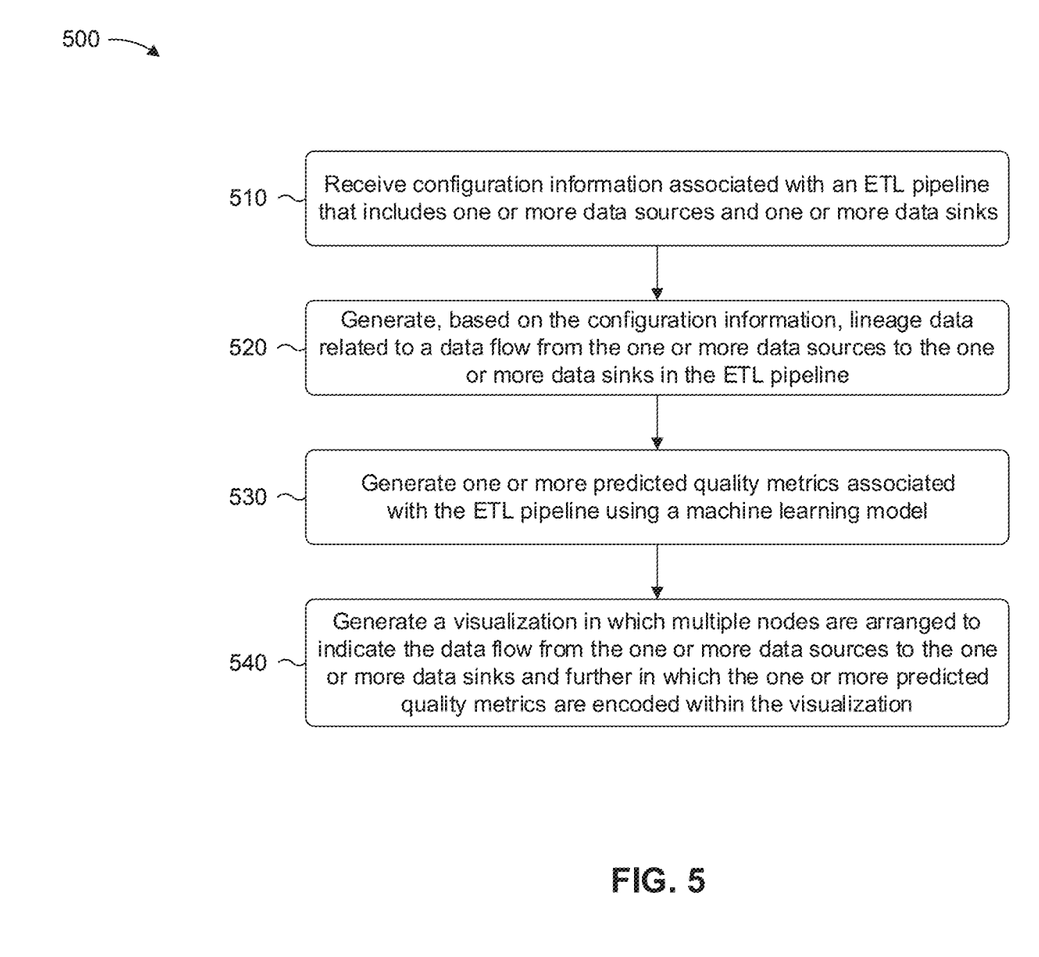
FIG. 5 is a flowchart of an example process relating to monitoring, predicting, and/or visualizing information related to an ETL pipeline.

FIG. 5 is a flowchart of an example process 500 associated with monitoring an ETL pipeline. In some implementations, one or more process blocks of FIG. 5 may be performed by an ETL monitoring platform (e.g., ETL monitoring platform 310). In some implementations, one or more process blocks of FIG. 5 may be performed by another device or a group of devices separate from or including the ETL monitoring platform, such as ETL system 320 and/or client device 360. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving configuration information associated with an ETL pipeline that includes one or more data sources and one or more data sinks (block 510). In some implementations, the configuration information indicates data records to be extracted from the one or more data sources, transformed from a source format to a target format, and loaded into the one or more data sinks.

As further shown in FIG. 5, process 500 may include generating, based on the configuration information, lineage data related to a data flow from the one or more data sources to the one or more data sinks in the ETL pipeline (block 520). As further shown in FIG. 5, process 500 may include generating one or more predicted quality metrics associated with the ETL pipeline using a machine learning model (block 530). In some implementations, the machine learning model is trained using historical execution data associated with one or more ETL jobs. As further shown in FIG. 5, process 500 may include generating a visualization in which multiple nodes are arranged to indicate the data flow from the one or more data sources to the one or more data sinks and further in which the one or more predicted quality metrics are encoded within the visualization (block 540).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for monitoring an extract, transform, load (ETL) pipeline, comprising:

one or more memories; and
one or more processors, coupled to the one or more memories, configured to:
  receive configuration information associated with the ETL pipeline that includes one or more data sources and one or more data sinks;
  execute one or more test cases within the ETL pipeline to generate one or more metrics associated with a quality or reliability of data in the ETL pipeline, the one or more test cases each being executed based on extracting respective test case data from a respective source table, transforming the respective test case data in the ETL pipeline, and loading the respective transformed test case data into a respective target table;
  generate one or more predicted quality metrics associated with the ETL pipeline using a machine learning model and using the one or more metrics,
    wherein the machine learning model is trained using historical execution data associated with one or more ETL jobs; and
  generate a visualization that indicates data flow from the one or more data sources to the one or more data sinks and that indicates the one or more predicted quality metrics.

2. The system of claim 1, wherein the visualization includes multiple nodes that indicate the data flow from the one or more data sources to the one or more data sinks.

3. The system of claim 2, wherein the multiple nodes represent one or more source tables storing data records to be extracted, transformed, and loaded, one or more target tables into which the data records are to be loaded, or one or more intermediate source tables in the data flow from the one or more source tables to the one or more target tables.

4. The system of claim 1, wherein the one or more processors are further configured to:
  generate lineage data related to the data flow from the one or more data sources to the one or more data sinks.

5. The system of claim 4, wherein the lineage data includes dependencies among one or more source tables, one or more intermediate source tables, or one or more target tables.

6. The system of claim 1, wherein the one or more predicted quality metrics relate to one or more of a timeliness, a service level agreement, or an accuracy associated with an ETL task.

7. The system of claim 1, wherein the one or more processors are further configured to:
  detect a failure or an anomaly in the data flow from the one or more data sources to the one or more data sinks in the ETL pipeline; and
  indicate a portion of the data flow affected by the failure or the anomaly in the visualization.

8. The system of claim 7, wherein the one or more processors are further configured to:
  terminate an ETL task associated with the ETL pipeline based on the failure or the anomaly in the data flow, or
  send a message to one or more users based on the failure or the anomaly in the data flow.

9. The system of claim 1, wherein the configuration information indicates data records to be extracted from the one or more data sources, transformed from a source format to a target format, and loaded into the one or more data sinks.

10. A method for visualizing information related to an extract, transform, load (ETL) pipeline, comprising:
  receiving, by an ETL monitoring device, configuration information associated with the ETL pipeline that includes one or more data sources and one or more data sinks;
  executing one or more test cases within the ETL pipeline to generate one or more metrics associated with a quality or reliability of data in the ETL pipeline, the one or more test cases each being executed based on extracting respective test case data from a respective source table, transforming the respective test case data in the ETL pipeline, and loading the respective transformed test case data into a respective target table;
  generating one or more predicted quality metrics associated with the ETL pipeline using a machine learning model and using the one or more metrics; and
  generating, by the ETL monitoring device and using the one or more predicted quality metrics, a visualization that indicates data flow from the one or more data sources to the one or more data sinks.

11. The method of claim 10, wherein the visualization includes multiple nodes that indicate the data flow from the one or more data sources to the one or more data sinks.

12. The method of claim 10, further comprising:
  generating lineage data related to the data flow from the one or more data sources to the one or more data sinks.

13. The method of claim 10, further comprising:
  detecting a failure or an anomaly in the data flow from the one or more data sources to the one or more data sinks in the ETL pipeline; and
  performing one or more actions based on the failure or the anomaly in the data flow.

14. The method of claim 13, wherein performing the one or more actions includes one or more of:
  causing the visualization to indicate a portion of the data flow affected by the failure or the anomaly,
  terminating an ETL task associated with the ETL pipeline, or
  generating a message that includes information related to the failure or the anomaly in the data flow.

15. The method of claim 10, further comprising:
  configuring the visualization to indicate information associated with the one or more predicted quality metrics based on one or more of using a color in a color palette or using an interaction associated with one or more nodes of the visualization.

16. A non-transitory computer-readable medium storing a set of instructions, the set of instructions comprising:
  one or more instructions that, when executed by one or more processors of an extract, transform, load (ETL) monitoring device, cause the ETL monitoring device to:
    execute one or more test cases within an ETL pipeline to generate one or more metrics associated with a quality or reliability of data in the ETL pipeline, the one or more test cases each being executed based on extracting respective test case data from a respective source table, transforming the respective test case data in the ETL pipeline, and loading the respective transformed test case data into a respective target table;
    detect a failure or an anomaly in the ETL pipeline using a machine learning model and the one or more metrics, the machine learning model being trained using historical execution data associated with one or more ETL jobs; and generate a visualization that indicates a data flow from one or more data sources of the ETL pipeline to one or more data sinks of the ETL pipeline,
  wherein the visualization indicates a portion of the data flow affected by the failure or the anomaly.

17. The non-transitory computer-readable medium of claim 16, wherein the failure or the anomaly in the ETL pipeline is detected based on one or more predicted quality metrics associated with an ETL task of the ETL pipeline.

18. The non-transitory computer-readable medium of claim 17, wherein the one or more predicted quality metrics are related to at least one of a timeliness, a service level agreement, or an accuracy associated with the ETL task.

19. The non-transitory computer-readable medium of claim 17, wherein the ETL task is configured to extract data records from the one or more data sources, transform the data records from a source format to a target format, or load the data records into the one or more data sinks.

20. The non-transitory computer-readable medium of claim 16, wherein the one or more instructions further cause the ETL monitoring device to:
  terminate an ETL task associated with the ETL pipeline based on the failure or the anomaly, or
  send, to one or more users, a message that includes information related to the failure or the anomaly.

* * * * *